Patented Dec. 2, 1930

1,783,778

UNITED STATES PATENT OFFICE

CASPER P. DE LORE AND BRACK B. McHAN, OF ST. LOUIS, MISSOURI; SAID McHAN ASSIGNOR TO SAID DE LORE

PROCESS OF TREATING BARYTES

No Drawing. Application filed March 7, 1927. Serial No. 173,597.

This invention relates to a process of treating barytes, and to the product obtained thereby.

As is known, barytes in a finely comminuted form is quite generally used as a pigment for paints.

The known process for treating barytes ore consists in grinding the crude barytes bearing ore to the desired fineness and then leaching out the acid soluble compounds, commonly found as impurities with the ore, by cooking with a hot solution of strong sulphuric acid. The most commonly present impurities are iron compounds, although various other metallic salts are usually present in a greater or less degree. It is the iron compounds, however, that produce most of the discoloration of the raw ground or natural product.

When the barytes ore is cooked with strong sulphuric acid, the iron is converted into the various sulphates of iron, the type of sulphate formed depending upon the nature of the iron compounds in the raw product, upon the strength of the acid used for leaching, the temperature and time of cooking, and, to a large extent, also upon the nature of free gases that are present in the cooking solution.

After the acid treatment, the iron oxides present in the raw product, which are the principal agents resulting in discoloration are converted into ferrous or ferric sulphate, or a mixture of the two, depending upon the nature of the oxide present in the raw ore, and the various other factors hereinbefore mentioned.

The various iron sulphates thus produced are, to a greater or less degree, soluble in water or in a mixture of water and sulphuric acid. But it is impossible under the present process to dissolve out all of the iron sulphates without a portion of the iron compounds being oxidized, resulting in a discoloration of the finished product. In order to accomplish as complete a washing out of the impurities as possible after the acid treatment, the acid-treated ore is subjected to a series of washings with water to dissolve out and separate from the mass the soluble iron sulphates and free acid used for leaching.

The barytes is then allowed to settle and the thickened pulp subjected to treatment in driers to dehydrate the same, thereby eliminating practically all moisture present.

The known process described fails to remove all of the iron compounds because there is a tendency of the ferrous sulphate to oxidize and form the basic ferric sulphate or ferric oxide having the characteristic brown color, and which compounds are practically insoluble in water.

In the past, from practical experiments in the treatment of raw barytes ore, it has been found practically impossible to wash the ground barytes free from all traces of iron compounds or from sulphuric acid without the iron compounds oxidizing to brown or red forms and thereby substantially discoloring the finished product.

In order to prevent, so far as possible, the formation of the discoloring impurities in the final product, a small percentage of free sulphuric acid is allowed to remain in the mass as it is carried over to the driers. This results in the finished product containing an appreciable quantity of free sulphuric acid and, at the same time, a sufficient quantity of the iron sulphate to deteriorate the product by discoloration when exposed to the atmosphere.

The iron sulphate present in the finished product produced by the known processes is sufficient, when oxidized by exposure to the air, ammonia, or other oxidizing agents, to give to the product a very appreciable yellow color. In other words, the final product as now manufactured is not an unalterable white and is, therefore, not entirely satisfactory as a pigment for paints on account of its tendency to discolor, and also on account of the free sulphuric acid it contains.

It is the purpose of the present invention to provide a process whereby the raw barytes ore may be subjected to a treatment that will remove all of the iron compounds as well as other reducible salts of various metals present with the barytes in the raw ore, and thereby produce a barytes free from impurities and free from acid, that is to say, an unalterable white neutral product.

The process follows the known process in treating the ground raw barytes ore by cooking it with sulphuric acid. After it has been cooked and bleached by sulphuric acid, the barytes in suspension in the water and sulphuric acid mixture is pumped to a wash tank and the ferric sulphates in solution are reduced to the ferrous state by means of a solution of sulphurous acid.

The ferrous sulphate has a greater degree of solubility than the ferric sulphate and it also has a higher solution pressure. It is, therefore, washed out much more quickly and more readily than when in the ferric condition. Furthermore, the ferric ions in solution are reduced by means of the sulphurous acid to ferrous ions.

It has been found by experiment that, by maintaining a sufficient concentration of sulphurous acid in the water with which the barytes is washed, the barytes may be washed entirely free of metallic compounds and particularly the iron compounds that are so detrimental to the finished product and furthermore entirely freed from all sulphuric acids. The degree of concentration of the sulphurous acid necessary is a degree of concentration that will overcome all tendency of the free dissolved oxygen in the water to cause oxidation. Necessarily this would be a variable factor and will depend upon the relative concentrations of the various substances in the material treated. In usual practice, the amount of sulphurous acid present would not be in excess of one percent (1%). It is not necessary that the ferric compounds be entirely reduced to the ferrous state by means of sulphurous acid, for it has been found that the barytes may be washed entirely free of the iron and acid compounds, regardless of whether the reduction from the ferric state to the ferrous state is complete. It is only necessary to prevent oxidation.

It will be understood also that the washing with the acid water continues until the material is freed from the metallic salts and that, during this washing operation, any sulphuric acid that forms during the reduction of the metallic salts is also washed from the material, leaving only the sulphurous acid.

In addition to preventing the oxidation of the iron salts or the oxidation of the other metallic salts present, the sulphurous acid in the wash water will also act as a solvent of the oxidized products, principally basic sulphates or the brown ferric hydroxide formed as a result of the bleaching process, converting them into ferrous bisulphites.

In the known process, it will be remembered that it has been attempted to remove these salts by leaving sulphuric acid in the solution, or adding it at the end of the washing process to redissolve these oxidized iron compounds and that this excess of free sulphuric acid was carried over with the mass to the driers. The sulphuric acid is not driven off from the mass by the drying process, but remains in the product giving it a distinct acid reaction.

On the other hand, in the present process, by the use of the sulphurous acid for the purpose of reducing the iron compounds, such sulphurous acid will be driven off completely in the drying process, as the sulphurous acid is readily reduced by heat to water vapor and sulphur dioxide gas, which are both driven off from the product by continued heating, thereby leaving the final product neutral.

The sulphurous acid may be made by any of the known methods and then added directly to the mixture of the barytes in the wash water, a sufficient quantity of the acid being added to produce the necessary degree of concentration to carry out the reactions above specifically pointed out.

The most practical method of providing the sulphurous acid for use in the present process is to generate the sulphur dioxide gas by means of burning sulphur, and then absorbing the gas in an absorption tower into which water is sprayed; then passing the concentrated solution to a storage tank, from which it may be added directly to the washing tank, as required.

The importance of the present process over the known methods has been demonstrated by the fact that the final product is an unalterable white pigment absolutely free from discoloring ingredients and also free from impurities that produce discoloration after being exposed to air or other oxidizing agent. The final product also gives a neutral reaction, whereas the product as now manufactured is slightly off color from white and, after it is exposed to air or other oxidizing agent, the discoloration increases. It also produces an acid reaction.

The free sulphuric acid remaining in the barytes tends to combine with the basic materials used in the manufacture of paint. This frequently results in discoloration and the formation of metallic soaps, which thicken the finished paint, or may cause the formation of hard scales and small hard particles throughout the mass of paint.

The iron sulphates remaining in the finished product also tend to combine with the free organic acid of the various paint oils, forming iron soaps. These iron soaps also tend to thicken the paint product, or form hard particles and scales therein.

We are aware that the invention may be modified within equivalent limits. We do not limit ourselves, therefore, to the exact process described, but what we claim and desire to secure by Letters Patent is:—

1. That step in the treatment of acid bleached barytes ore which consists in washing the ore with a wash water containing a sufficient quantity of a reducing agent to prevent oxidation of the metallic salt present with the barytes and to convert insoluble salts into a soluble salt whereby the product may be washed free of impurities.

2. The process of treating acid bleached raw barytes ore which consists in adding sulphurous acid thereto to convert insoluble salts into soluble salts, and then washing out the salts and driving off the acid from the product.

3. That step in the treatment of acid bleached raw barytes ore which consists in adding to a suspension in water of said ore a sufficient quantity of sulphurous acid to prevent oxidation of metallic salts present with the barytes, and to convert insoluble salts into soluble salts, whereby the product may be washed free of impurities and the acid removed therefrom by heat.

4. The process of producing an iron free and neutral barytes which consists in bleaching the raw barytes ore with acid by cooking, then carrying the product in suspension in water, adding thereto sulphurous acid in a sufficient degree of concentration to prevent oxidation of the metallic salts present and to convert the insoluble salts to a soluble state, then washing the product free from impurities, and drying the product.

CASPER P. DE LORE.
BRACK B. McHAN.